(12) United States Patent
Xie

(10) Patent No.: US 12,432,396 B2
(45) Date of Patent: Sep. 30, 2025

(54) LIVE-STREAMING PROCESSING METHOD AND APPARATUS

(71) Applicant: Hangzhou AliCloud Apsara Information Technology Co., Ltd., Hangzhou (CN)

(72) Inventor: Liqun Xie, Hangzhou (CN)

(73) Assignee: Hangzhou AliCloud Apsara Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/833,827

(22) PCT Filed: Jan. 13, 2023

(86) PCT No.: PCT/CN2023/072120
§ 371 (c)(1),
(2) Date: Jul. 26, 2024

(87) PCT Pub. No.: WO2023/143134
PCT Pub. Date: Aug. 3, 2023

(65) Prior Publication Data
US 2025/0150646 A1  May 8, 2025

(30) Foreign Application Priority Data

Jan. 27, 2022  (CN) .......................... 202210099241.0

(51) Int. Cl.
H04N 21/2187  (2011.01)
G06T 17/00  (2006.01)
(Continued)

(52) U.S. Cl.
CPC ......... H04N 21/2187 (2013.01); G06T 17/00 (2013.01); H04N 21/23412 (2013.01); H04N 21/4318 (2013.01)

(58) Field of Classification Search
None
See application file for complete search history.

(56) References Cited

U.S. PATENT DOCUMENTS

2017/0214701 A1  7/2017 Hasan
2022/0189173 A1* 6/2022 Zhou .................. G06V 10/80
(Continued)

FOREIGN PATENT DOCUMENTS

CN  105208465 A  12/2015
CN  109819276 A  5/2019
(Continued)

OTHER PUBLICATIONS

The Extended European Search Report dated Feb. 13, 2025 for Application No. 23746016.7.
(Continued)

Primary Examiner — Junior O Mendoza

(57) ABSTRACT

Embodiments of the present disclosure provide a live-streaming processing method and apparatus, where the live-streaming processing method includes: using a virtual character to live-stream in a live-streaming room and acquiring a live-streaming setting parameter of the live-streaming room, where the live-streaming setting parameter includes an intelligent broadcast time interval corresponding to an intelligent play mode; determining a scene type to be played corresponding to the intelligent play mode in a case that it is determined that a current clive-streaming time reaches a starting time point of the intelligent broadcast time interval; acquiring a material to be played corresponding to the scene type to be played from a preset resource pool, determining data to be played of the intelligent play mode based on the material to be played; and controlling the virtual character to live-stream for the data to be played in the live-streaming room.

20 Claims, 9 Drawing Sheets

(51) Int. Cl.
    *H04N 21/234*     (2011.01)
    *H04N 21/431*     (2011.01)

(56) References Cited

U.S. PATENT DOCUMENTS

| | | | |
|---|---|---|---|
| 2023/0023085 | A1 | 1/2023 | Zhu |
| 2025/0126304 | A1* | 4/2025 | Zhang .................. G06T 17/00 |
| 2025/0142138 | A1* | 5/2025 | Zhang .............. H04N 21/4758 |

FOREIGN PATENT DOCUMENTS

| | | |
|---|---|---|
| CN | 109982148 A | 7/2019 |
| CN | 110677697 A | 1/2020 |
| CN | 110781346 A | 2/2020 |
| CN | 110784759 A | 2/2020 |
| CN | 110850983 A | 2/2020 |
| CN | 110868635 A | 3/2020 |
| CN | 112188230 A | 1/2021 |
| CN | 112333179 A | 2/2021 |
| CN | 212625976 U | 2/2021 |
| CN | 112543342 A | 3/2021 |
| CN | 112601100 A | 4/2021 |
| CN | 112616063 A | 4/2021 |
| CN | 113194350 A | 7/2021 |
| CN | 113423017 A | 9/2021 |
| CN | 113453034 A | 9/2021 |
| CN | 113691829 A | 11/2021 |
| CN | 113766253 A | 12/2021 |
| CN | 113766296 A | 12/2021 |
| CN | 113825031 A | 12/2021 |
| CN | 113923462 A | 1/2022 |
| CN | 114125569 A | 3/2022 |
| WO | WO2015148693 A1 | 10/2015 |
| WO | WO2021134178 A1 | 7/2021 |

OTHER PUBLICATIONS

International Search Report and Written Opinion dated May 4, 2023 for International Application No. PCT/CN2023/072120.
The First Office Action dated Mar. 17, 2022 for Chinese Application No. 202210099241.0.
Notification to Grant Patent Right for Invention dated Apr. 22, 2022 for Chinese Application No. 202210099241.0.
Xiao Hongbo "Analysis of the phenomenon of livestream carrying goods from the perspective of interactive ritual chain" Mar. 2020, No. 13, News Tribune.
Supplementary European Search Report dated Feb. 12, 2025 for European Application No. 23752254.5.

\* cited by examiner

LIVE-STREAMING PROCESSING METHOD AND APPARATUS

CROSS-REFERENCE TO RELATED APPLICATIONS

This application is a National Stage of International Application No. PCT/CN2023/072120, filed on Jan. 13, 2023, which claims priority to Chinese Patent Application No. 202210099241.0, filed to China National Intellectual Property Administration on Jan. 27, 2022 and entitled "LIVE-STREAMING PROCESSING METHOD AND APPARATUS". The contents of the two applications are hereby incorporated by reference in their entireties.

TECHNICAL FIELD

Embodiments of the present disclosure relate to the field of computer technology, and in particular, to a live-streaming processing method.

BACKGROUND

With continuous development of a live-streaming technology, watching live-streaming has become an important entertainment activity in people's lives. At present, a virtual character can be used instead of a real anchor for live-streaming, so that uninterrupted live-streaming throughout a day can be achieved. However, at present, in a live-streaming of a virtual character, a video played is generated in advance according to pre-designed script content and played in the live-streaming room. This live-streaming method cannot enable the virtual character to live-stream for current real-time hotspot content. Since the pre-designed script content is completed manually, it also consumes a lot of manpower and material resources, so it not only makes the virtual character unable to live-stream for real-time hotspot content, but also makes the live-streaming consume a lot of resources, and can not attract viewers to watch the live-streaming of the virtual character.

SUMMARY

In view of this, embodiments of the present disclosure provide a live-streaming processing method. One or more embodiments of the present disclosure simultaneously relate to a live-streaming processing apparatus, a computing device, a computer-readable storage medium, and a computer program to address technical deficiencies existing in the prior art.

According to a first aspect of an embodiment of the present disclosure, a live-streaming processing method is provided, which is applied to a virtual live-streaming control system and includes:

using a virtual character to live-stream in a live-streaming room and acquiring a live-streaming setting parameter of the live-streaming room, where the live-streaming setting parameter includes an intelligent broadcast time interval, and the intelligent broadcast time interval corresponds to an intelligent play mode;

determining a scene type to be played corresponding to the intelligent play mode according to a current play scene type, scene state information and/or play resource attribute information of the live-streaming room in a case that it is determined that a current live-streaming time of the live-streaming room reaches a starting time point of the intelligent broadcast time interval;

acquiring a material to be played corresponding to the scene type to be played from a preset resource pool based on the scene type to be played, and determining data to be played of the intelligent play mode based on the material to be played; and controlling the virtual character to live-stream for the data to be played in the live-streaming room.

According to a second aspect of an embodiment of the present disclosure, a live-streaming processing apparatus is provided, which is applied to a virtual live-streaming control system and includes:

a parameter acquisition module, configured to use a virtual character to live-stream in a live-streaming room and acquire a live-streaming setting parameter of the live-streaming room, where the live-streaming setting parameter includes an intelligent broadcast time interval, and the intelligent broadcast time interval corresponds to an intelligent play mode;

a scene type determination module, configured to determine a scene type to be played corresponding to the intelligent play mode according to a current play scene type, scene state information and/or play resource attribute information of the live-streaming room in a case that it is determined that a current live-streaming time of the live-streaming room reaches a starting time point of the intelligent broadcast time interval;

a data determination module, configured to acquire a material to be played corresponding to the scene type to be played from a preset resource pool based on the scene type to be played, and determine data to be played of the intelligent play mode based on the material to be played; and a data live-streaming module, configured to control the virtual character to live-stream for the data to be played in the live-streaming room.

According to a third aspect of an embodiment of the present disclosure, a computing device is provided, including:

a memory and a processor;

where the memory is used to store computer executable instructions, and the processor is configured to execute the computer executable instructions, and the computer executable instruction is executed by the processor to implement the steps of the live-streaming processing method.

According to a fourth aspect of an embodiment of the present disclosure, a computer-readable storage medium is provided, which stores a computer-executable instruction, when the computer-executable instruction is executed by a processor, the steps of the live-streaming processing method are implemented.

According to a fifth aspect of an embodiments of the present disclosure, a computer program is provided, when the computer program is executed in a computer, the computer is caused to execute the steps of the live-streaming processing method.

An embodiment of the present disclosure provides a live-streaming processing method, which uses a virtual character to live-stream in a live-streaming room and acquires a live-streaming setting parameter of the live-streaming room, where the live-streaming setting parameter includes an intelligent broadcast time interval, and the intelligent broadcast time interval corresponds to an intelligent play mode; determines a scene type to be played corresponding to the intelligent play mode according to a current play scene type, scene state information and/or play resource attribute information of the live-streaming room in a case that it is determined that a current live-streaming time of the live-streaming room reaches a starting time point of the intelligent broadcast time interval; acquires a material to be played corresponding to the scene type to be played from a preset resource pool based on the scene type to be played, and determines data to be played of the intelligent play mode based on the material to be played; and controls the virtual character to live-stream for the data to be played in the live-streaming room.

Specifically, by setting the intelligent broadcast time interval and the corresponding intelligent play mode in the live-streaming room, in the case that it is determined that the current live-streaming time reaches the starting time point of the intelligent broadcast time interval, the scene type to be played can be intelligently determined according to the current play scene type, the scene state information and/or the play resource attribute information, the material to be played corresponding to the scene type can be acquired from the preset resource pool, then the data to be played corresponding to the scene type to be played can be played in the virtual live-streaming room, and the material to be played can be displayed in the virtual live-streaming room. The method of intelligently determining the scene type to be played can screen out a scene to be played that meet a requirement of a current hotspot according to a current real-time hotspot content. At the same time, the method of acquiring the material from the preset resource pool also further screens out the material to be played that meet the requirement of the current hotspot. It is realized that the virtual character can living-stream for the material to be played and the data to be played corresponding to the real-time hotspot content, which not only saves the resources of manual script writing, but also attracts viewers to watch the live-streaming by the virtual character.

DESCRIPTION OF EMBODIMENTS

Figure 1:
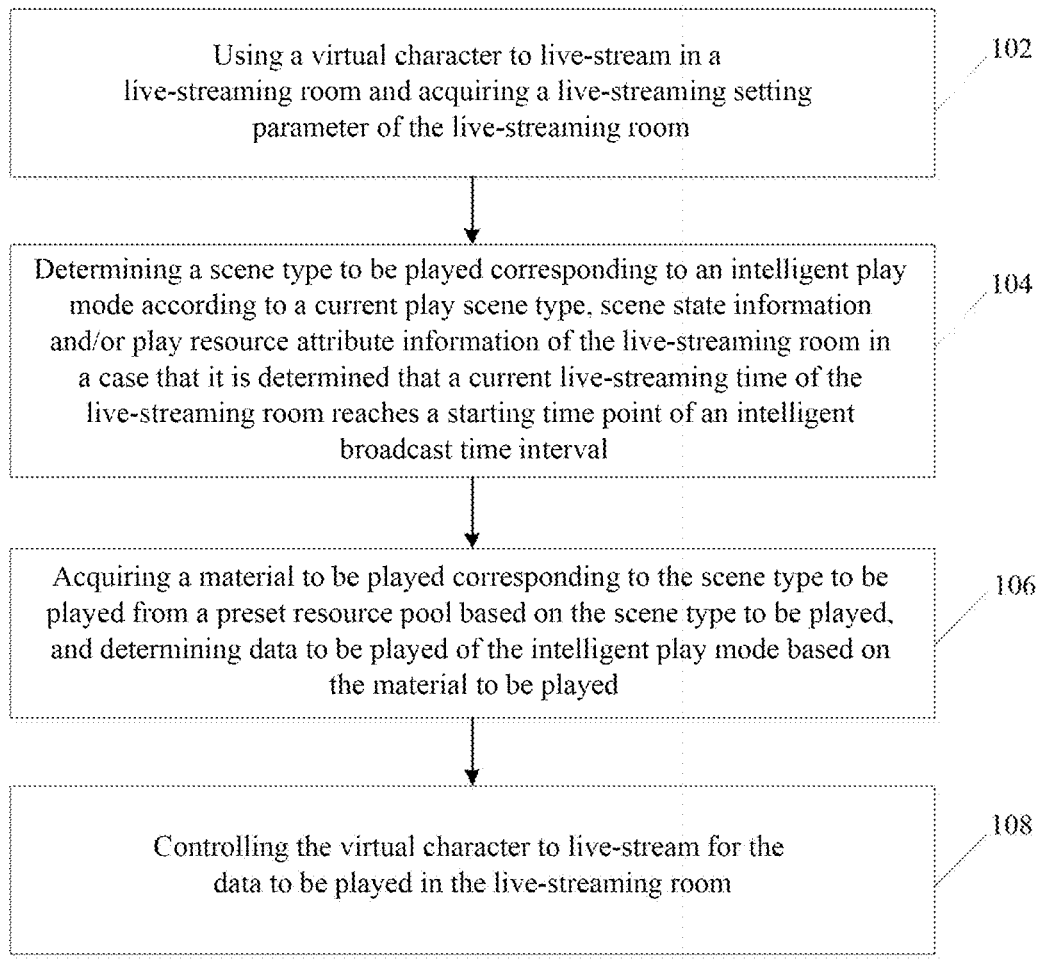
FIG. 1 is a flow diagram of a live-streaming processing method provided by an embodiment of the present disclosure.

Many specific details are given in the following description to facilitate a full understanding of the present disclosure. However, the present disclosure may be implemented in many ways different from those described herein, and persons skilled in the art may do similar promotion without violating the intension of the present disclosure, and therefore the present disclosure is not subject to the specific implementation disclosed below.

Terms used in one or more embodiments of the present disclosure are used solely for the purpose of describing specific embodiments and are not intended to limit one or more embodiments of the present disclosure. The terms "a", "said" and "the" in the singular form as used in one or more embodiments of the present disclosure and the accompanying claims are also intended to include the majority form, unless the context clearly indicates otherwise. It should also be understood that the term "and/or" as used in one or more embodiments of the present disclosure refers to and encompasses any or all possible combinations of one or more related listed items.

It should be understood that although the terms first and second classes may be used to describe various information in one or more embodiments of the present disclosure, such information should not be limited to these terms. These terms are used only to distinguish the same type of information from one another. For example, without departing from the scope of one or more embodiments of the present disclosure, the first may also be referred to as the second, and likewise the second may be referred to as the first. Depending on the context, the word "if" as used here can be interpreted as "at time of . . . " or "when . . . " or "in response to determination of".

First, noun terms involved in one or more embodiments of the present disclosure is explained.

Live-streaming room: each live stream's presentation window corresponds to one live-streaming room. The live-streaming room is unique in a project platform.

Virtual live-streaming room: the virtual live-streaming room can be understood as a live-streaming apartment with a specific type (a type of live-streaming by a virtual character as an anchor in a live-streaming room) in a live-streaming room. For example, it may include but not limited to game live-streaming room, film live-streaming room, life live-streaming room, comprehensive live-streaming room, etc. The virtual live-streaming room here can be any live-streaming apartment, and the virtual live-streaming room can include virtual anchors, scenes, live-streaming text and other components.

Script: a pre-written live-streaming plan to guide conduct of a live-streaming. 1) what are the links; 2) when respectively; 3) what to do in each link and how long it takes; 4) what should be done; 5) what to say; 6) what behaviors an anchor does; 7) how surroundings change with a scene. It's all dictated by the script. The script is composed of multiple scenes, but the script is not bound to the anchor, that is, a script is all these scenes, but different anchors can use this script for live-streaming.

Scene: a scene (an abstract concept we define) is a smallest unit that can be used for live-streaming, for example: introduction of an item is a separate scene.

No script mode: instead of writing a script in advance in a virtual live-streaming room, the virtual live-streaming room determines script content that should be broadcast in the live-streaming currently through an intelligent decision system.

Intelligent dynamic script: content of a script that can be broadcast in a live-streaming room through an intelligent decision.

Timed script: planning in advance to play specific script content in a specific time period.

Semi-intervention: in some cases, live-streaming content of a live-streaming room is intelligently decided, and in some cases, the live-streaming content is manually intervened, such as a timed script.

During medium and large events, the virtual live-streaming room may live-stream for content related to the medium and large events according to a current live-streaming content, but the live-streaming content is generated in real time and cannot be edited in advance. Therefore, a pre-designed script content cannot meet a requirement of playing relevant content generated in real time in the live-streaming room. Based on this, a live-streaming processing method provided by an embodiment of the present disclosure is to plan content broadcast in the live-streaming in advance before the virtual character begins to live-stream in the virtual live-streaming room. However, it is not necessary to plan specific live-streaming content. A type to be played can be determined first, for example, it is planned to broadcast 10 pieces of sports games news from 8 am in advance. News content is current and fresh content, but a news scene is broadcast, rather than a product, an express or a game scene. Then, it is necessary to make an intelligent decision that the content scene that needs to be broadcast at 8 am is a news scene, and then the specific news content can be determined in real time according to an event that occurred before 8 am. Further, the live-streaming processing method provided by the embodiment of the present disclosure not only broadcasts an intelligent dynamic script, but also broadcasts a timed script, which is carried out in a fixed time interval according to the pre-designed script content, so as to realize the live-streaming in the live-streaming room by alternating artificial and intelligent operation by using the intelligent script and the timed script. It can not only drive the virtual character to live-stream for related data of the real-time hotspot content, but also live-stream for the broadcast content in the timed script, which not only saves human resources, but also attracts viewers to watch the live-streaming by the virtual character.

It should be noted that the live-streaming processing method provided by the embodiment of the present disclosure can be understood as a semi-intervention and unscripted live-streaming technology solution. In the unscripted semi-intervention mode, some contents requiring manual intervention are arranged manually, while contents not requiring arrangement are decided intelligently and automatically, and a resource pool for decision-making can be continuously expanded through supplementing resource content, which greatly reduces cost of manual operation cost. The script content can be modified during the operation process, which also improves fault tolerance of the script, so that the script can be dynamically changed before being not broadcast on the basis that there is no need to re-open the live-streaming.

In the present disclosure, a live-streaming processing method is provided. The present disclosure also relates to a live-streaming processing apparatus, a computing device, a computer readable storage medium, and a computer program, which are described in detail in the following embodiments.

FIG. 1 shows a flow diagram of a live stream processing method provided according to an embodiment of the present disclosure, including the following steps.

It should be noted that the live-streaming processing method provided in the embodiment of the present disclosure is applied to a virtual live-streaming control system. Taking large-scale sports events (such as sports games) as an example, the live-streaming processing method is explained, and specific application scenarios are not specified.

Step 102: using a virtual character to live-stream in a live-streaming room and acquiring a live-streaming setting parameter of the live-streaming room.

The live-streaming setting parameter includes an intelligent broadcast time interval, and the intelligent broadcast time interval corresponds to an intelligent play mode. The virtual character can be understood as a virtual image of an artificial man anchor in the virtual live-streaming room, for example, in a winter sports live-streaming room, the virtual character can be an artificial man wearing skating suit and ski suit, and a specific virtual image is not specifically limited in the embodiment of the present disclosure.

In practical application, the virtual live-streaming control system controls the virtual character to imitate a real anchor to live-stream in the virtual live-streaming room, and acquires the live-streaming setting parameter of the virtual live-streaming room, where the live-streaming setting parameter includes the intelligent broadcast time interval of the virtual character in the virtual live-streaming room, and the intelligent broadcast time interval corresponds to the intelligent play mode (a mode to be played under an intelligent dynamic script mode). For example, the intelligent broadcast time interval of the virtual live-streaming room is four time periods, namely 8:00-9:00, 12:00-13:00, 15:00-16:00, and 19:00-20:00 (the number of time periods is not specifically limited in this embodiment). That is, in the above four time periods, the virtual live-streaming room can broadcast real-time news content, or broadcast data related to the real-time news content, and broadcast content in the above four time periods is unpredictable in advance.

It should be noted that a proportion of the intelligent broadcast time interval in the 24 hours of the day can be set according to different application requirements, and the embodiment of the present disclosure is not specifically limited.

Figure 2:
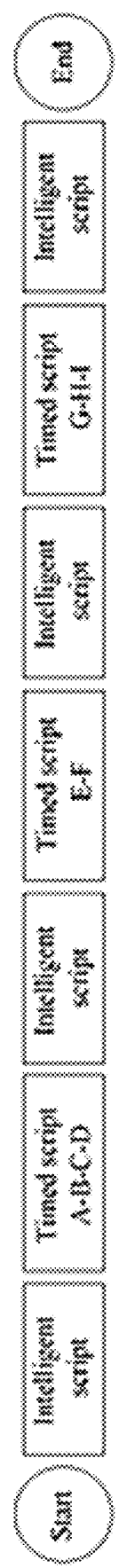
FIG. 2 is a schematic diagram of resource content generation in a live-streaming processing method provided by an embodiment of the present disclosure.

Refer to FIG. 2, which shows a diagram of a running time axis in a live-streaming processing method provided by an embodiment of the present disclosure.

It should be noted that the running time axis can include not only the intelligent broadcast time interval, but also a timed broadcast time interval, where the timed broadcast time interval can be understood as a time interval of broadcasting a timed script.

As shown in FIG. 2, the running time axis of the live-streaming room includes intelligent script play and timed script play. A n intelligent script broadcast time interval has four time periods, while a timed script broadcast time interval has three time periods, including a pre-designed timed script A-B-C-D, a timed script E-F and a timed script G-H-I. Then, in the entire running time from the beginning to the end of the running time axis, the intelligent script and the timed script are broadcast alternately. In the time period of intelligent script broadcast, the live-streaming is run by the intelligent script of the virtual live-streaming control system based on broadcast context and broadcast scene decision, and the timed script is an intervention process of manual script writing.

It should be noted that a specific running time axis of the virtual live-streaming room can be set according to different setting requirements of the live-streaming room. In this embodiment, only this example is illustrated, and a specific intelligent script broadcast time interval and a specific timed script broadcast time interval are not specified.

Step 104: determining a scene type to be played corresponding to an intelligent play mode according to a current play scene type, scene state information and/or play resource attribute information of the live-streaming room in a case that it is determined that a current live-streaming time of the live-streaming room reaches a starting time point of an intelligent broadcast time interval.

The current play scene type can be understood as a scene type of current play content in the virtual live-streaming room, such as news scene, commodity scene, encyclopedia scene, etc. The scene state information can be understood as state information of the scene that can broadcast in the current virtual live-streaming room, such as a scene fatigue degree, a scene play interval, etc. The play resource attribute information can be understood as resource attribute information broadcast in the current virtual live-streaming room, such as a play resource related label, a play resource timeliness, and a play resource weight.

It should be noted that in the live-streaming processing method provided by the embodiment of the present disclosure, the scene state information includes the scene fatigue degree, the scene play interval, and the play resource attribute information includes the play resource related label, the play resource timeliness, and the play resource weight. In actual application scenarios, the scene state information and the play resource attribute information are limited to the above content. Different elements that affect the scene type to be played can be considered according to different application scenarios, which is not specifically limited here.

The scene fatigue degree can be understood as a fatigue score of the scene broadcast. For example, if the data of news scenes is being broadcast in the virtual live-streaming room before the scene type to be played is decided, the scene fatigue degree of news scenes can be evaluated as 5 points, which means that the scene fatigue degree of the news scenes is high. A next scene to be broadcast is dynamically decided to be other scene data except for the news scene to ensure diversity of broadcast scene types in the virtual live-streaming room. The scene play interval can be understood as the number of scenes that need to be separated between the same scene type, for example, three other scene data need to be separated between the scene types explaining encyclopedia knowledge.

The play resource related label can be understood as a resource data label, identifier, etc. The resource timeliness can be understood as a timeliness of resource information in the current virtual live-streaming room. For example, the news that has been broadcast in advance has a lower timeliness in the current virtual live-streaming room, while resource content that has not been broadcast has a higher timeliness. The resource weight can be understood as an importance of resource data broadcast in the current virtual live-streaming room, which determines whether the resource data is broadcast at the current time.

In practical application, after determining the intelligent broadcast time interval of the current virtual live-streaming room, the virtual live-streaming control system can start the intelligent dynamic script broadcast mode in the case that the current live-streaming time of the virtual live-streaming room is detected to reach the starting time point of the intelligent broadcast time interval. Firstly, the scene type to be played corresponding to the intelligent play mode is decided according to the current play scene type in the live-streaming room. In this way, not only the current play scene type can be considered, but also the scene state information (the scene fatigue degree, the scene play interval, etc.) and the play resource attribute information (the play resource related label, the play resource timeliness, the play resource weight, etc.) can be considered.

For example, if the current virtual live-streaming room does not reach the intelligent broadcast time interval, that is, before 8:00, and the scene type broadcast is news scene, then in a case that the current virtual live-streaming room reaches 8:00, the virtual live-streaming control system decides that the scene type to be played is an encyclopedia knowledge scene associated with the news scene during the time period from 8:00 to 9:00 by making an intelligent decision.

Figure 3:
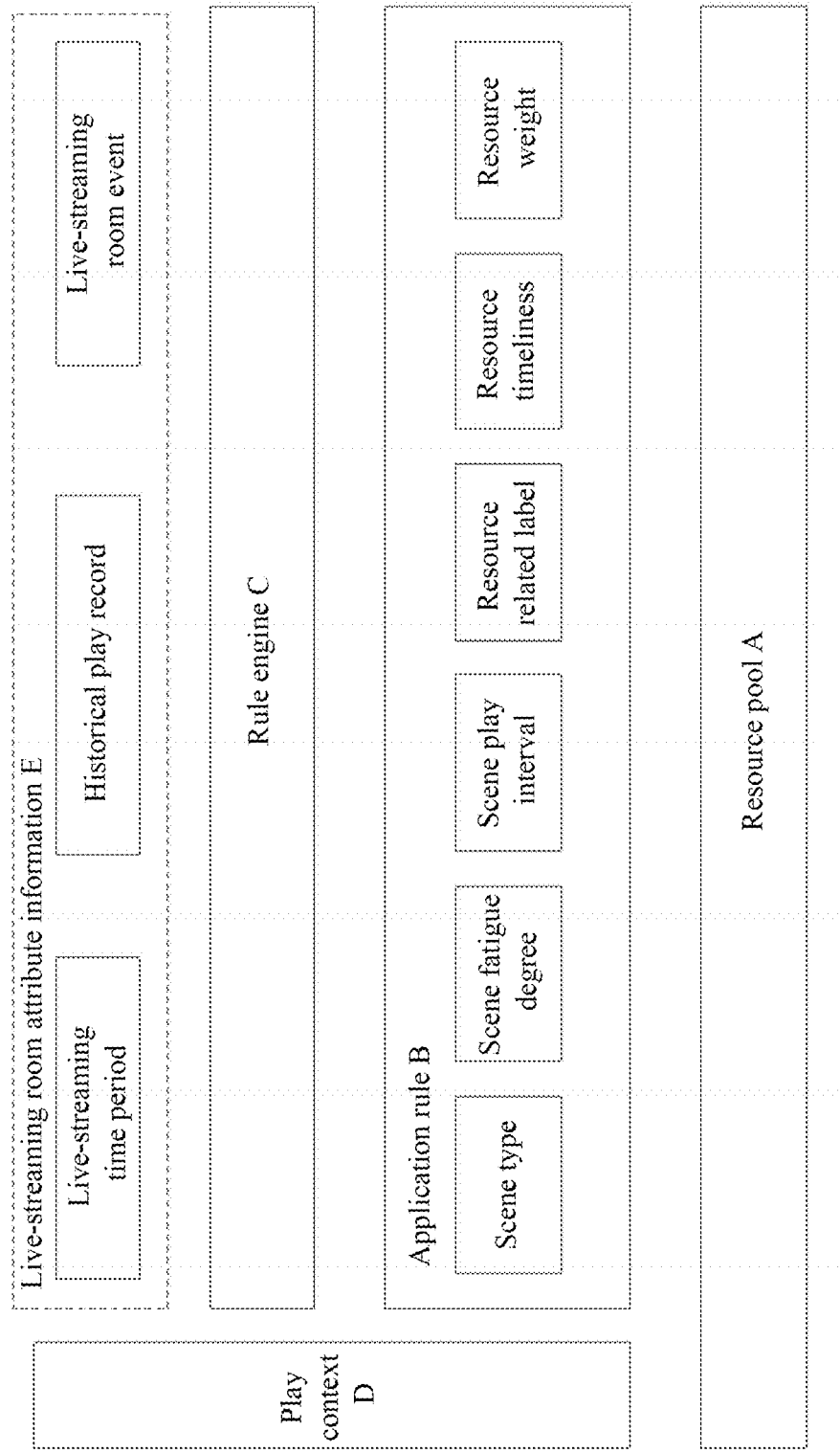
FIG. 3 is a schematic diagram of decision-making of a scene type to be played in a live-streaming processing method provided by an embodiment of the present disclosure.

For details, please refer to FIG. 3, which shows a schematic diagram of decision-making of a scene type to be played in a live-streaming processing method provided by an embodiment of the present disclosure.

In FIG. 3, a resource pool A, an application rule B, a rule engine C, play context D, and live-streaming room attribute information E are shown. In practical application, the virtual live-streaming control system intelligently decides a scene type to be played through intelligent ability, and decides a scene type to be played broadcast in the intelligent broadcast time interval of the virtual live-streaming room from the resource pool A. Specifically, the rule engine C (rule expression engine) uses multiple decision factors in the application rule B, including a scene type, a scene fatigue degree, a scene play interval, a resource related label, a resource timeliness, and a resource weight, to decide the scene type to be played in the current virtual live-streaming room. At the same time, the virtual live-streaming control system can further determine the scene type to be played based on the play context D and the live-streaming room attribute information E (live-streaming time period, historical play records, and live-streaming room events). For example, after explaining the related knowledge of skiing in the sports games above, the scene type to be played is decided to explain the scene data corresponding to the relevant scene types such as ski goods and skiers.

Step 106: acquiring a material to be played corresponding to the scene type to be played from a preset resource pool based on the scene type to be played, and determining data to be played of the intelligent play mode based on the material to be played.

In order to live-stream for real-time hotspot content in the virtual live-streaming room, or live-stream for content data associated with the real-time hotspot content, a material to be played corresponding to the scene type to be played can be acquired from the preset resource pool in real-time, and then the data to be played corresponding to the intelligent play mode is determined.

In practical application, the virtual live-streaming control system determines the material to be played corresponding to the scene type to be played from the preset resource pool according to the scene type to be played which is intelligently decided. The preset resource pool can be understood as broadcast data corresponding to a real-time event. For example, during a large-scale sports meeting, athlete A wins a gold medal in a skating event, resource data that can be broadcast in the virtual live-streaming room is generated according to the real-time event that the athlete A wins the gold medal, such as training deeds of the athlete A, encyclopedia knowledge of the athlete A and so on. The virtual live-streaming control system can acquire the material to be played corresponding to the determined scene type to be played from the preset resource pool and determine the data to be played of the intelligent play mode based on the material to be played.

Further, in order to make the virtual live-streaming room acquire the data to be played corresponding to the real-time hotspot content, the source data from multiple data sources can be processed, and then the preset resource pool can be constructed. Specifically, before the acquiring the material to be played corresponding to the scene type to be played from the preset resource pool based on the scene type to be played, the method further includes: acquiring source data from one or more data sources; preprocessing the source data based on a preset data processing rule to determine resource text corresponding to the source data, and constructing scene for the scene text based on a scene protocol construction rule to acquire scene data corresponding to the resource text; and constructing the preset resource pool based on the resource text and the scene data.

The data sources can be understood as platforms that publish hotspot content data, such as news websites, express platforms, manually written content platforms, and other virtual live-streaming rooms. The preset data processing rule can be understood as data parsing, data cleaning, data marking, data auditing and other processing rules for source data. The scene protocol construction rule can be understood as integrating corresponding scene data into the text to be broadcast and constructing scene data that can be broadcast in the live-streaming room.

In practical application, the virtual live-streaming control system can acquire source data from the one or more data sources, where the acquisition method can be monitoring published network data, interface docking of a target publishing platform, data synchronization of other live-streaming rooms, etc. The specific acquisition method is not specified here. After acquiring the source data, the source data can also be preprocessed to execute the process of data parsing, data cleaning, data marking and data auditing. The preprocessing process for the data is not specifically limited in the embodiment of the present disclosure. After preprocessing, the resource text corresponding to the source data can be acquired, which can also be understood as structured data extraction of the source data can be performed to acquire the resource text that can be broadcast by the virtual character. After determining the resource text, the virtual live-streaming control system can also construct resource content, that is, the scene data corresponding to the resource text, conforming to a scene definition protocol based on the scene protocol construction rule. Then, the preset resource pool is constructed according to the resource text and scene data corresponding to the source data.

Figure 4:
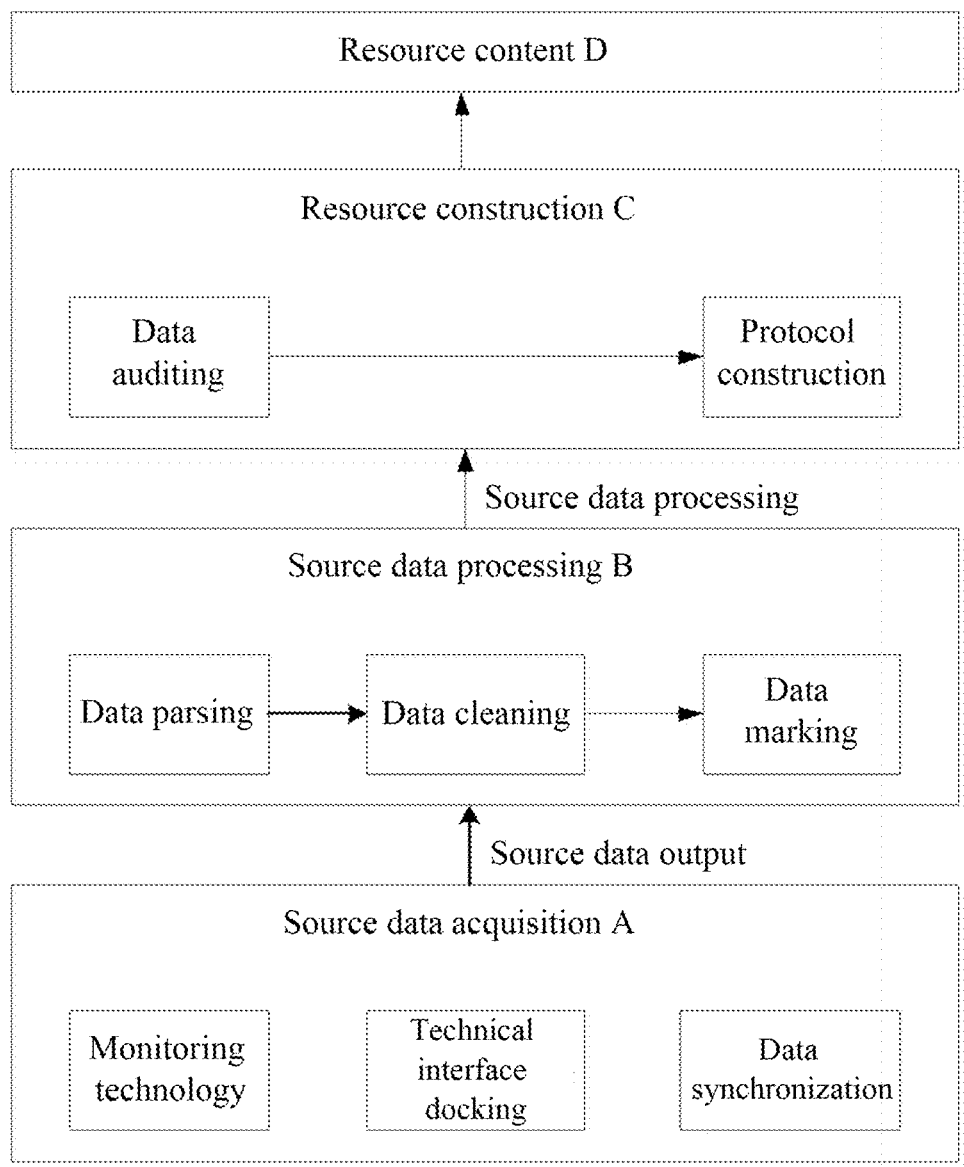
FIG. 4 is a schematic diagram of resource content generation in a live-streaming processing method provided by an embodiment of the present disclosure.

Refer to FIG. 4, which shows a schematic diagram of resource content generation in a live-streaming processing method provided by an embodiment of the present disclosure.

FIG. 4 includes four parts, namely source data acquisition A, source data processing B, resource construction C, and resource content D.

In practical application, a method of acquiring the resource content by the virtual live-streaming control system can be acquired from bottom to top in FIG. 4. In the source data acquisition A, source data can be acquired from one or more data sources by methods of monitoring technology, technical interface docking, and data synchronization, and then acquired source data is output to source data processing B for data preprocessing. The preprocessing process includes data parsing, data cleaning, and data marking. After the source data is processed, the processed source data can be input into the resource construction C to perform scene protocol construction. The resource construction C carries out a preliminary check on the processed source data before performing the scene protocol construction. After the check is passed, the scene protocol construction is performed and inputs the resource content D.

The live-streaming processing method provided by the embodiment of the present disclosure acquires the current real-time source data through multiple data sources, and then inputs the resource text and scene data corresponding to the source data into the preset resource pool to facilitate the subsequent acquisition of the data to be played corresponding to the scene type to be played in the intelligent broadcast mode from the preset resource pool, and achieve broadcast of the real-time hotspot content in the virtual live-streaming room.

In order to acquire the material to be played corresponding to the scene type to be played in the preset resource pool, the virtual live-streaming control system can determine corresponding keyword information to be played according to keyword information of current broadcast content, and then acquire the corresponding material to be played. Specifically, the acquiring the material to be played corresponding to the scene type to be played from the preset resource pool based on the scene type to be played includes: acquiring keyword information of current broadcast content in the live-streaming room, where the current broadcast content is associated with the current play scene type; determining keyword information to be played in the scene type to be played based on the keyword information; and determining a material to be played corresponding to the keyword information to be played from the preset resource pool based on the keyword information to be played.

It should be noted that the content broadcast by the virtual live-streaming control system in the intelligent broadcast time interval can be associated with the broadcast content before the intelligent broadcast time interval. Then, after the scene type to be played is intelligently decided, the specific broadcast content of the intelligent broadcast time interval needs to be determined in real-time.

In practical application, the virtual live-streaming control system acquires the corresponding keyword information according to the current broadcast content of the current broadcast scene type in the live-streaming room, and then determines the keyword information associated with the scene type to be played according to the keyword information as the keyword information to be played, and then searches the material to be played corresponding to the keyword information to be played from the preset resource pool according to the keyword information to be played.

For example, the keyword information of the current broadcast content in the live-streaming room is "skiing encyclopedia", in a case that the scene type to be played is determined to be the news scene type, the keyword information to be played in the news scene type is determined to be "skiing". In addition, the material to be played corresponding to "ski" can be determined in the preset resource pool, such as skiing photos, skiing characters, videos, etc.

The live-streaming processing method provided by the embodiment of the present disclosure determines the keyword information in the next scene type to be played according to the keyword information of the current broadcast content in the live-streaming room, and then determines the material to be played corresponding to the keyword information to enrich the diversity of real-time content played in the virtual live-streaming room.

Further, after acquiring the material to be played from the preset resource pool, the virtual live-streaming control system generates the data to be played which can be played in the live-streaming room according to text and scene data in the material to be played. In particular, the determining the data to be played of the intelligent play mode based on the material to be played includes: determining intelligent play text and intelligent scene data based on the material to be played; and generating the data to be played of the intelligent play mode based on the intelligent play text and the intelligent scene data.

In practical application, the virtual live-streaming control system can parse the material to be played and determine the intelligent play text and the intelligent scene data broadcast by the virtual character in the virtual live-streaming room. For example, the characters, pictures, videos, etc. are displayed in the virtual live-streaming room, and then the data to be played of the intelligent play mode is generated according to the acquired intelligent play text and the acquired intelligent scene data.

The live-streaming processing method provided by the embodiment of the present disclosure generates the data to be played in the intelligent play mode through the intelligent play text and the intelligent scene data in the material to be played, so as to enrich the diversity of the data to be played in the virtual live-streaming room and attract viewers to watch.

Step 108: controlling the virtual character to live-stream for the data to be played in the live-streaming room.

In practical application, after determining the data to be played, the virtual live-streaming control system can control the virtual character in the virtual live-streaming room to live-stream for the data to be played, including the intelligent play text, the intelligent scene data and other play data.

In addition, the virtual live-streaming room includes not only the intelligent broadcast time interval, but also a timed broadcast time interval. Furthermore, the live-streaming processing method provided by the embodiment of the present disclosure can trigger a preset task to be played and broadcast the content of the timed script within the timed broadcast time interval. Specifically, the live-streaming setting parameter further includes the timed broadcast time interval, and the timed broadcast time interval corresponds to a timed play mode.

Accordingly, the live-streaming processing method provided by the embodiment of the present disclosure further includes: triggering a preset task to be played in the timed play mode corresponding to a starting time point in a case that it is determined that the current live-streaming time of the live-streaming room reaches the starting time point of the timed broadcast time interval; and controlling the virtual character to live-stream for data to be played corresponding to the task to be played in the live-streaming room.

Following the above example, the timed broadcast time interval is five time periods, namely 0:00-8:00, 9:00-12:00, 13:00-15:00, 16:00-19:00, and 20:00-24:00. Then, in the above timed broadcast time interval, the content of the timed script is broadcast in sequence in the virtual live-streaming room.

In practical application, in the case that the current live-streaming time of the virtual live-streaming room reaches the starting time point of the timed broadcast time interval, the task to be played preset at the starting time point can be triggered, which means that the task to be played in the timed play mode can be broadcast in the virtual live-streaming room from the starting time point. The virtual live-streaming control system can control the virtual character to live-stream for the data to be played corresponding to the task to be played in the virtual live-streaming room.

For example, the current broadcast time is 9:00, that is, the current broadcast time has reached a time period of 9:00-12:00 of the timed broadcast time interval, then the current live-streaming room can trigger a task A to be played configured at 9:00, then the task A to be played can be broadcast within 9:00-12:00 of the timed broadcast time interval.

The live-streaming processing method provided by the embodiment of the present disclosure can trigger the preset task to be played to realize the broadcast of the timed script in the case that it is determined that the current live-streaming time of the live-streaming room reaches the starting time point of the timed broadcast time interval.

In order to make the timed script start broadcast in sequence in a fixed time interval, a task to be played can be created in the timed broadcast time interval to achieve the ability to broadcast in a fixed time. In particular, before the case that it is determined that the current live-streaming time of the live-streaming room reaches the starting time point of the timed broadcast time interval, the method includes: acquiring timed broadcast text of the live-streaming room, and creating the task to be played in the timed play mode based on the timed broadcast text and the timed broadcast time interval; and placing the task to be played successively in a timed play queue according to a sequence of the timed broadcast time interval.

The timed broadcast text can be understood as manual pre-arranged broadcast text in the timed script, such as explanation of skiing sports events, introduction of skiing equipment, and so on.

In practical application, after acquiring the timed broadcast text of the live-streaming room, the virtual live-streaming control system can determine the timed broadcast time interval of the timed broadcast text, and then create the task to be played in the timed play mode according to the timed broadcast text and the timed broadcast time interval. For example, acquired timed broadcast text A is text content of the introduction of skiing equipment. Since the introduction of products set in the evening time to broadcast may attract more viewers. Then it can determine that the timed broadcast time interval corresponding to the timed broadcast text A is 20:00-24:00, and the tasks to be played can be created as: when the time point is 20:00, the timed broadcast text A is broadcast, that is, the text content of the introduction of skiing equipment is broadcast.

Further, after determining the task to be played, the virtual live-streaming control system can place multiple tasks to be played successively in the timed play queue in chronological sequence, and wait for the live-streaming time of the live-streaming room to reach a corresponding trigger time point, and then broadcast the task to be played in the virtual live-streaming room in sequence.

The live-streaming processing method provided by the embodiment of the present disclosure creates the task for the timed broadcast text, so that the task to be played corresponding to the timed broadcast text wait in the timed play queue, which is convenient for subsequent triggering of the task to be played in the timed play queue, so as to realize a function of playing the timed script in the timed broadcast time interval.

Further, the virtual broadcast control system triggers the task to be played in sequence in the timed play queue. Specifically, the triggering the preset task to be played in the timed play mode corresponding to the starting time point includes: based on the starting time point of the timed broadcast time interval, determining the task to be played in the timed play mode from the timed play queue, and triggering the task to be played.

In practical application, the virtual live-streaming control system can determine the live-streaming time of the current virtual live-streaming room based on the starting time point of the timed broadcast time interval, and will trigger the task to be played in the timed play mode corresponding to the starting time point when the live-streaming time reaches each starting time point, and then realize broadcast of the task to be played.

Figure 5:
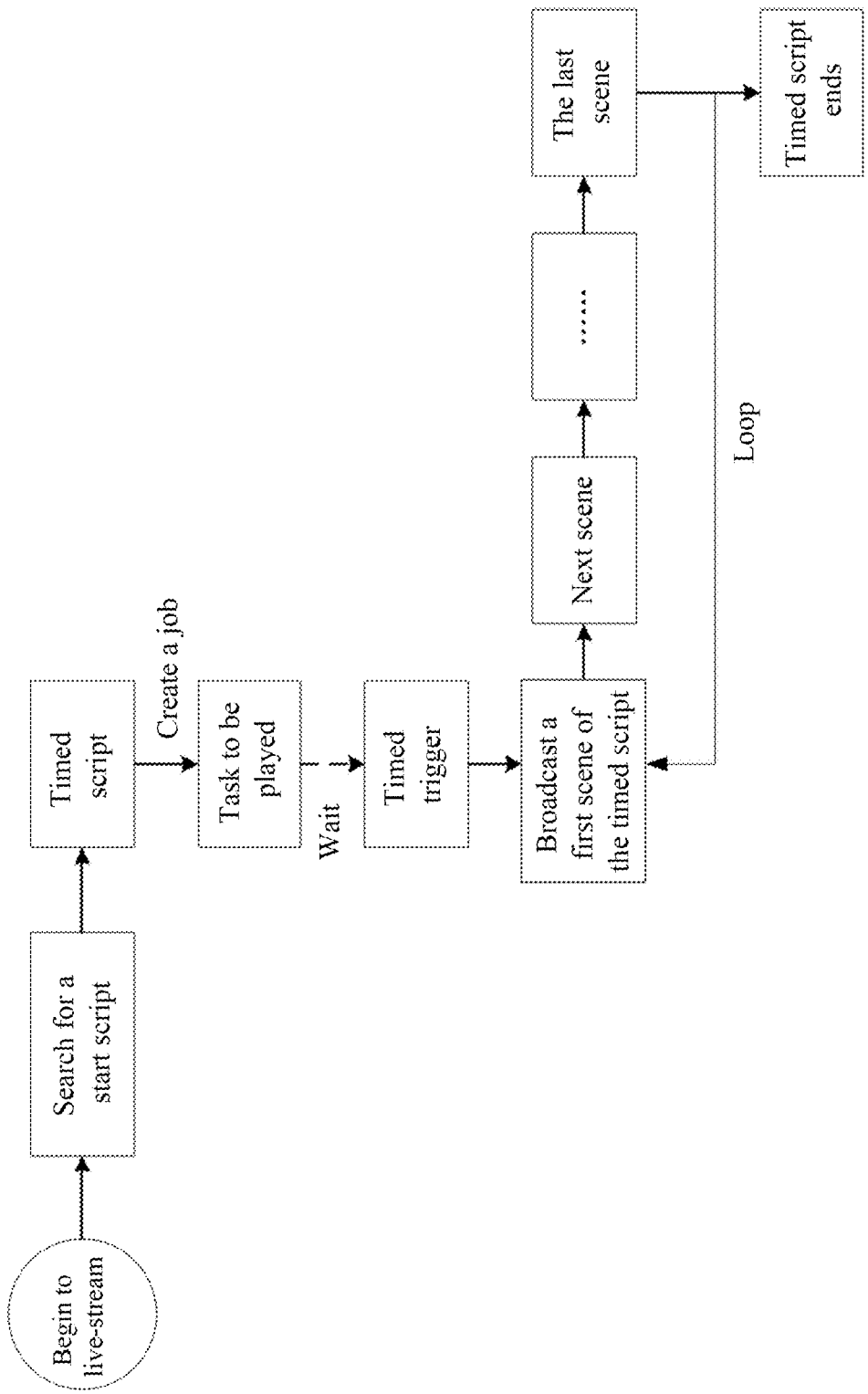
FIG. 5 is a flow schematic diagram of creation and triggering of a timed script in a live-streaming processing method provided by an embodiment of the present disclosure.

Refer to FIG. 5, which shows a flow schematic diagram of creation and triggering of a timed script in a live-streaming processing method provided by an embodiment of the present disclosure.

In FIG. 5, after the virtual character begins to live-stream in the virtual live-streaming room, the virtual live-streaming control system searches for a start script. In a case that the timed script is determined, a job (a task to be played) can be created for the timed script, and the task to be played can wait in the timed play queue to wait for a time point in which the task to be played can be triggered. When the time point for triggering the task to be played is reached, the task to be played is triggered at a timed time, and a first scene of the timed script starts to be broadcast. Then, the task to be played is triggered in sequence according to the tasks to be played in the timed play queue until the last scene, and then the task is circularly broadcast in the timed play queue until the timed broadcast time interval ends and the timed script ends.

The live-streaming processing method provided by the embodiment of the present disclosure can trigger the task to be played according to the starting time point through the timed play queue, so as to realize that the play data corresponding to the task to be played is broadcast in sequence within the timed broadcast time interval.

In addition, in order to meet the timeliness of the timed script or user's requirements, the live-streaming processing method provided by the embodiment of the present disclosure can also modify the timed script in advance, or add or modify and delete originally designed timed script to cope with some unexpected operational requirements.

Specifically, before the controlling the virtual character to live-stream for the data to be played corresponding to the task to be played in the live-streaming room, the method further includes: receiving a text modification request sent by a user for the task to be played, and determining text to be modified in a timed play text based on modification information carried in the text modification request; and sending prompt information indicating that it is unable to modify the text to the user in a case that it is determined that the task to be played in the timed play mode has been triggered.

In practical application, the virtual live-streaming control system can receive the text modification request sent by the user for the task to be played, and then determine the text to be modified in the timed play text in the task to be played, in which specific modification information can be carried in the text modification request and deletion or addition or other processing is user-customized. However, not all tasks to be played in the timed play queue can be manually modified. If it is determined that the task to be played has been triggered in the timed play mode, it cannot be further modified. Then, prompt information that the text cannot be modified can be sent to the user.

The live-streaming processing method provided by the embodiment of the present disclosure can also provide an opportunity to modify the timed broadcast text in the task to be played, but does not provide an opportunity to modify the task to be played that has been triggered. It can not only meet the operational requirements of the timed broadcast text, but also meet the accuracy and timeliness of the broadcast according to this method.

Further, the virtual live-streaming control system can also modify the timed broadcast text that has not been triggered in the timed play queue, and create a new task to be played using the modified timed broadcast text. Specifically, after the determining the text to be modified in the timed play text based on the modification information carried in the text modification request, the method further includes: in a case that it is determined that the task to be played in the timed play mode has not been triggered, modifying the text to be modified based on the modification information to acquire modified text to be played; modifying the starting time point of the timed broadcast time interval corresponding to the task to be played based on the modification information to acquire a modified starting time point to be played; and creating a new task to be played based on the modified text to be played and the modified starting time point to be played, and deleting an untriggered task to be played.

In practical application, the virtual live-streaming control system can modify the text to be modified according to the modification information and acquire the modified text to be played in the case that it is determined that the task to be played in the timed play mode has not been triggered. Because the task to be played has not been triggered, the starting time point of the timed broadcast time interval corresponding to the task to be played can be further modified. For example, if the starting time point of the broadcast before being modified is 20:00, the starting time point can be modified to 20:30. On this basis, a new task to be played can be created according to the modified text to be played and the modified starting time point. In addition, it can wait for the newly created task to be played to be triggered. At the same time, the untriggered task to be played can be deleted directly. For example, in an operation process of a live-streaming room for a large-scale sports meeting, some major events may occur, but these events are unknown in advance, or some operational arrangements temporarily change, an existing script is disrupted, the timed script can be adjusted on the basis that there is no need to re-open the live-streaming after these events are known.

Figure 6:
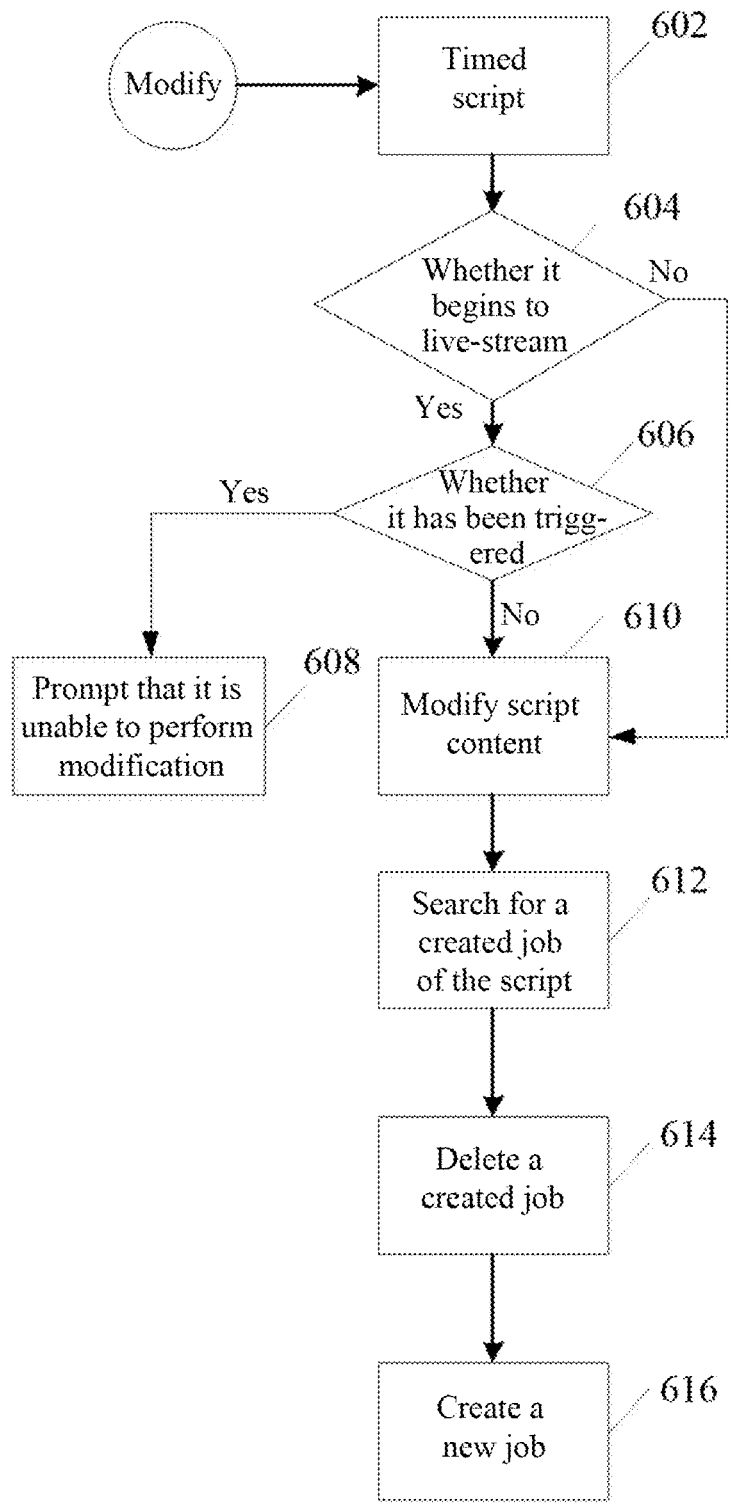
FIG. 6 is a flow diagram of modification of a timed script in a live-streaming processing method provided by an embodiment of the present disclosure.

Refer to FIG. 6, which shows a flow diagram of modification of a timed script in a live-streaming processing method provided by an embodiment of the present disclosure.

Step 602: a virtual live-streaming control system receives a modification request for a timed script.

Step 604: the virtual live-streaming control system determines whether it begins to live-stream for a current timed script, if yes, step 606 is executed; if not, Step 610 is executed.

Step 606: the virtual live-streaming control system checks whether a task to be played of the current timed script has been triggered, if yes, step 608 is executed; if not, step 610 is executed.

Step 608: the virtual live-streaming control system prompts the user with information that it is unable to perform modification.

Step 610: the virtual live-streaming control system modifies script content based on modification information in the modification request.

Step 612: the virtual live-streaming control system searches for a created job (a task to be played) of the timed script.

Step 614: the virtual live-streaming control system deletes the created job (a task to be played).

Step 616: the virtual live-streaming control system creates a new job (a new task to be played) based on the modified script content.

The live-streaming processing method provided by the embodiment of the present disclosure modifies timed play text, and then creates the new task to be played based on the modified timed play text, so as to realize dynamic change of the script content and increase fault tolerance of the script.

In addition, the live-streaming processing method provided by the embodiment of the present disclosure further includes: acquiring an interstitial event occurring in the live-streaming room, and determining interstitial text corresponding to the interstitial event based on the interstitial event; constructing a scene for the interstitial text based on a scene protocol construction rule, and determining data to be played corresponding to the interstitial text; and driving the virtual character to interstitially played the data to be played in the live-streaming room.

The interstitial event can be understood as an event that gives an immediate reply to a question in a comment area of the live-streaming room and an event that needs to be played in the live-streaming room immediately.

In practical application, the virtual live-streaming control system, after acquiring the interstitial event occurring in the live-streaming room, can determine the interstitial text corresponding to the interstitial event, and then construct the scene of the interstitial text according to the scene protocol construction rule and determine the data to be played corresponding to the interstitial text, and then drive the virtual character to interstitially played the data to be played in the live-streaming room. Any event that can be interstitially played in the virtual live-streaming room can be interstitially played in the live-streaming room.

The live-streaming processing method provided by the embodiment of the present disclosure determines the corresponding interstitial text of the interstitial event, and constructs the scene for the interstitial text, and determines the data to be played to be played in the virtual live-streaming room, so as to realize the interstitial play of the immediate event.

In conclusion, in the live-streaming processing method provided by the embodiment of the present disclosure, through a semi-intervention mode of the virtual live-streaming room, some contents requiring manual intervention are arranged manually, while contents not requiring arrangement are decided intelligently and automatically. Moreover, a resource pool for decision-making can be continuously expanded through supplementing resource content, which greatly reduces cost of manual operation, and the script can be dynamically changed before being not broadcast on the basis that there is no need to re-open the live-streaming. The intelligent script and the artificial script are used to realize the live-streaming in the live-streaming room by alternating artificial and intelligent operation, and in the process of live-streaming, content can be expanded through content indoctrination. Intelligent dynamic script can share pressure of manual script writing, which reduces pressure of manual script writing. At the same time, ability to dynamically change the script content is increased, which increases the fault tolerance of the script. A part of intelligent implementation can also be customized according to an application scene, which can realizes platform ability more flexibly.

Figure 7:
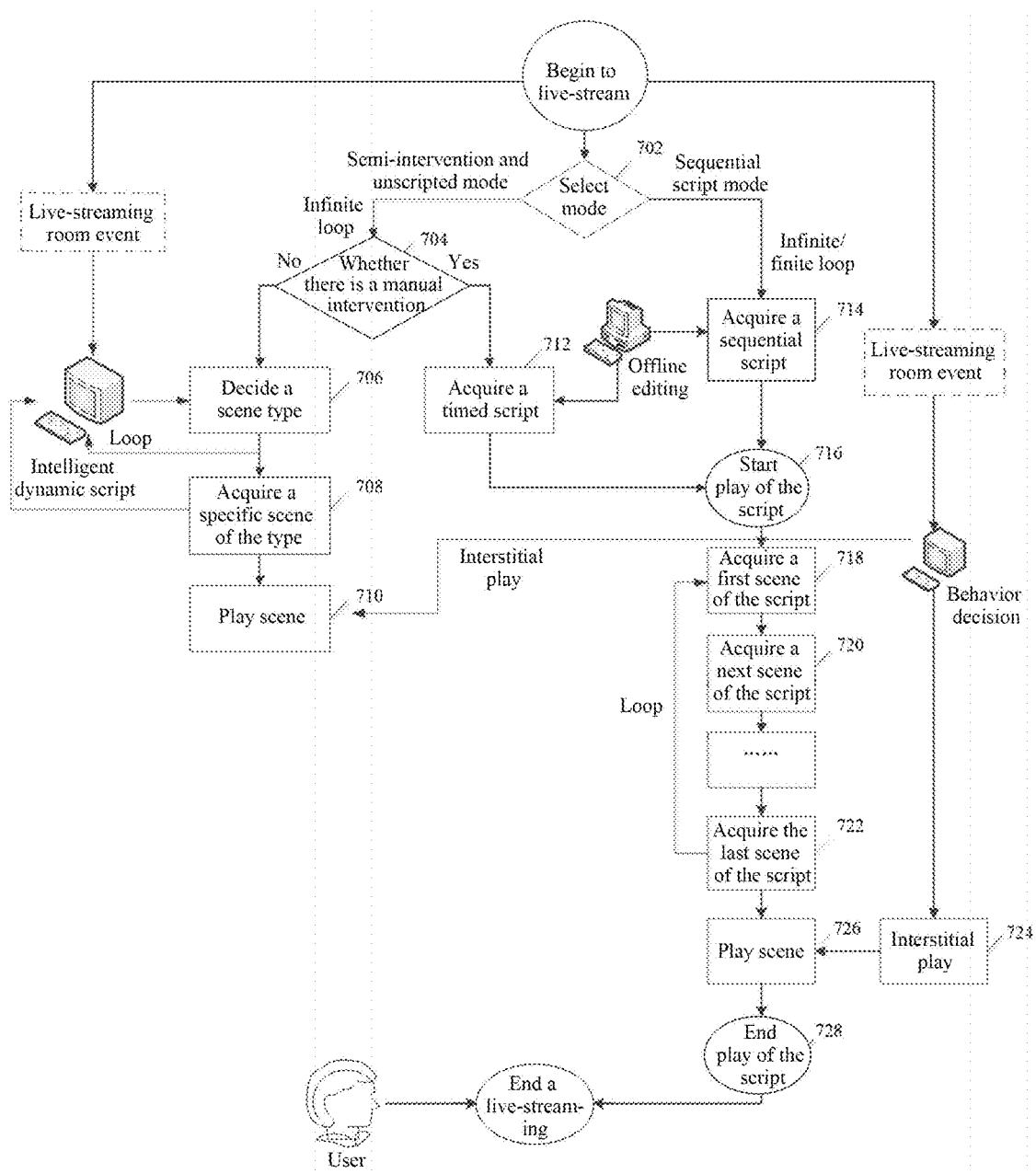
FIG. 7 is a flow diagram of a processing process of a live-streaming processing method provided by an embodiment of the present disclosure.

In combination with FIG. 7, the application of the live-streaming processing method provided in the present disclosure in the virtual live-streaming room is taken as an example to further explain the live-streaming processing method. FIG. 7 shows a flow diagram of a processing process of a live-streaming processing method provided by an embodiment of the present disclosure, which, in particular, includes the following steps.

Step 702: a virtual live-streaming control system selects a broadcast mode in a live-streaming room, if a semi-intervention and unscripted mode is selected, step 704 is executed; if a sequential script mode is selected, step 714 is executed.

Step 704: the virtual live-streaming control system determines whether a manual intervention mode is executed, if yes, step 712 is executed; if not, step 706 is executed.

Step 706: the virtual live-streaming control system dynamically and intelligently decides a scene type based on an acquired live-streaming room event.

It should be noted that each scene type is decided intelligently and dynamically, and the scene type is constantly decided for training to determine a scene type to be played.

Step 708: the virtual live-streaming control system acquires a specific play scene of the scene type.

Step 710: the virtual live-streaming control system controls to play the specific scene.

Step 712: the virtual live-streaming control system acquires a timed script from an offline editing server and then continues to execute step 716.

Step 714: in a case that the play mode is determined to be a sequential script mode, the virtual live-streaming control system acquires a sequential script from the offline editing server, and then continues to execute step 716.

Step 716: the virtual live-streaming control system controls to start play of the script.

Step 718: the virtual live-streaming control system acquires a first scene of the script.

Step 720: the virtual live-streaming control system acquires a next scene of the script.

Step 722: the virtual live-streaming control system acquires the last scene of the script.

It should be noted that a play scene in the timed script or the sequential script can be circularly played during a play time.

Step 724: the virtual live-streaming control system can also realize interstitial play of the live-streaming room event in the process of playing the timed script or the sequential script.

In addition, the virtual live-streaming control system can also realize interstitial play of the live-streaming room event in an intelligent script play mode.

Step 726: the virtual live-streaming control system controls the virtual live-streaming room to broadcast play scene data.

Step 728: the virtual live-streaming control system controls to end the play of the script, or a user controls a virtual character in the live-streaming room to end the live-streaming.

In conclusion, in the live-streaming processing method provided by the embodiment of the present disclosure, through a semi-intervention mode of the virtual live-streaming room, some contents requiring manual intervention are arranged manually, while contents not requiring arrangement are decided intelligently and automatically. Moreover, a resource pool for decision-making can be continuously expanded through supplementing resource content, which greatly reduces cost of manual operation, and the script can be dynamically changed before being not broadcast on the basis that there is no need to re-open the live-streaming, and the semi-intervention and unscripted mode for the live-streaming is realized.

Figure 8:
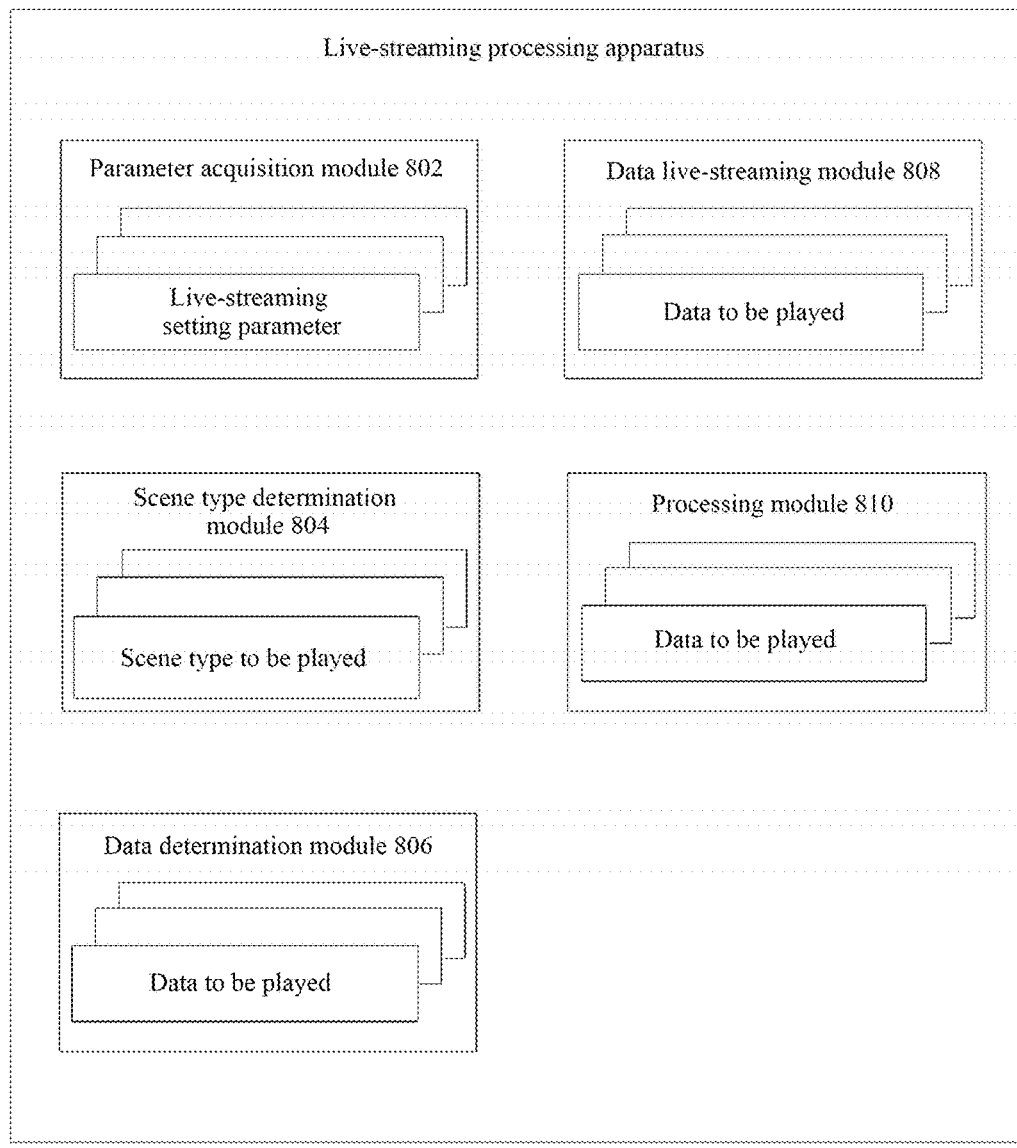
FIG. 8 is a structural diagram of a live-streaming processing apparatus provided by an embodiment of the present disclosure.

Corresponding to the above method embodiments, the present disclosure also provides an embodiment of a live-streaming processing apparatus. FIG. 8 shows a structural diagram of a live-streaming processing apparatus provided by an embodiment of the present disclosure. As shown in FIG. 8, the apparatus is applied to the virtual live-streaming control system and includes a parameter acquisition module 802, a scene type determination module 804, a data determination module 806 and a data live-streaming module 808.

The parameter acquisition module 802 is configured to use a virtual character to live-stream in a live-streaming room and acquire a live-streaming setting parameter of the live-streaming room, where the live-streaming setting parameter includes an intelligent broadcast time interval, and the intelligent broadcast time interval corresponds to an intelligent play mode.

The scene type determination module 804 is configured to determine a scene type to be played corresponding to the intelligent play mode according to a current play scene type, scene state information and/or play resource attribute information of the live-streaming room in a case that it is determined that a current live-streaming time of the live-streaming room reaches a starting time point of the intelligent broadcast time interval.

The data determination module 806 is configured to acquire a material to be played corresponding to the scene type to be played from a preset resource pool based on the scene type to be played, and determine data to be played of the intelligent play mode based on the material to be played.

The data live-streaming module 808 is configured to control the virtual character to live-stream for the data to be played in the live-streaming room.

In an implementation, the live-streaming setting parameter further includes a timed broadcast time interval, and the timed play mode corresponding to a timed broadcast time interval.

In an implementation, the apparatus further includes: a processing module 810, configured to trigger a preset task to be played in the timed play mode corresponding to a starting time point in a case that it is determined that the current live-streaming time of the live-streaming room reaches the starting time point of the timed broadcast time interval; and control the virtual character to live-stream for data to be played corresponding to the task to be played in the live-streaming room.

In an implementation, the scene state information includes a scene fatigue degree, a scene play interval, and the play resource attribute information includes a play resource related label, a play resource timeliness, and a play resource weight.

In an implementation, the data determination module 806 is further configured to: acquire keyword information of current broadcast content in the live-streaming room, where the current broadcast content is associated with the current play scene type; determine keyword information to be played in the scene type to be played based on the keyword information; and determine a material to be played corresponding to the keyword information to be played from the preset resource pool based on the keyword information to be played.

In an implementation, the data determination module 806 is further configured to: determine intelligent play text and intelligent scene data based on the material to be played; and generate the data to be played of the intelligent play mode based on the intelligent play text and the intelligent scene data.

In an implementation, the processing module 810 is further configured to: acquire source data from one or more data sources; preprocess the source data based on a preset data processing rule to determine resource text corresponding to the source data, and construct scene for the scene text based on a scene protocol construction rule to acquire scene data corresponding to the resource text; and construct the preset resource pool based on the resource text and the scene data.

In an implementation, the processing module 810 is further configured to: acquire timed broadcast text of the live-streaming room, and create the task to be played in the timed play mode based on the timed broadcast text and the timed broadcast time interval; and place the task to be played successively in a timed play queue according to a sequence of the timed broadcast time interval.

In an implementation, the processing module 810 is further configured to: based on the starting time point of the timed broadcast time interval, determine the task to be played in the timed play mode from the timed play queue, and trigger the task to be played.

In an implementation, the processing module 810 is further configured to: receive a text modification request sent by a user for the task to be played, and determine text to be modified in a timed play text based on modification information carried in the text modification request; and send prompt information indicating that it is unable to modify the text to the user in a case that it is determined that the task to be played in the timed play mode has been triggered.

In an implementation, the processing module 810 is further configured to: in a case that it is determined that the task to be played in the timed play mode has not been triggered, modify the text to be modified based on the modification information to acquire modified text to be played; modify the starting time point of the timed broadcast time interval corresponding to the task to be played based on the modification information to acquire a modified starting time point to be played; and create a new task to be played based on the modified text to be played and the modified starting time point to be played, and delete an untriggered task to be played.

In an implementation, the processing module 810 is further configured to: acquire an interstitial event occurring in the live-streaming room, and determine interstitial text corresponding to the interstitial event based on the interstitial event; construct a scene for the interstitial text based on a scene protocol construction rule, and determine data to be played corresponding to the interstitial text; and enable the data live-streaming module 808 to drive the virtual character to interstitially played the data to be played in the live-streaming room.

In the live-streaming processing apparatus provided by the embodiment of the present disclosure, by setting the intelligent broadcast time interval and the corresponding intelligent play mode in the live-streaming room, in the case that it is determined that the current live-streaming time reaches the starting time point of the intelligent broadcast time interval, the scene type to be played can be intelligently determined according to the current play scene type, the scene state information and/or the play resource attribute information, the material to be played corresponding to the scene type can be acquired from the preset resource pool, then the data to be played corresponding to the scene type to be played can be played in the virtual live-streaming room, and the material to be played can be displayed in the virtual live-streaming room. The method of intelligently determining the scene type to be played can screen out a scene to be played that meet a requirement of a current hotspot according to a current real-time hotspot content. At the same time, the method of acquiring the material from the preset resource pool also further screens out the material to be played that meet the requirement of the current hotspot. It is realized that the virtual character can living-stream for the material to be played and the data to be played corresponding to the real-time hotspot content, which not only saves the resources of manual script writing, but also attracts viewers to watch the live-streaming by the virtual character.

The above is an illustrative scheme of a live-streaming processing apparatus of the present embodiment. It should be noted that a technical scheme of the live-streaming processing apparatus belongs to the same idea as a technical scheme of the above-mentioned live-streaming processing method. For details not described in detail in the technical scheme of the apparatus for the live-streaming processing, reference may be made to the description of the technical scheme of the above-mentioned live-streaming processing method.

Figure 9:
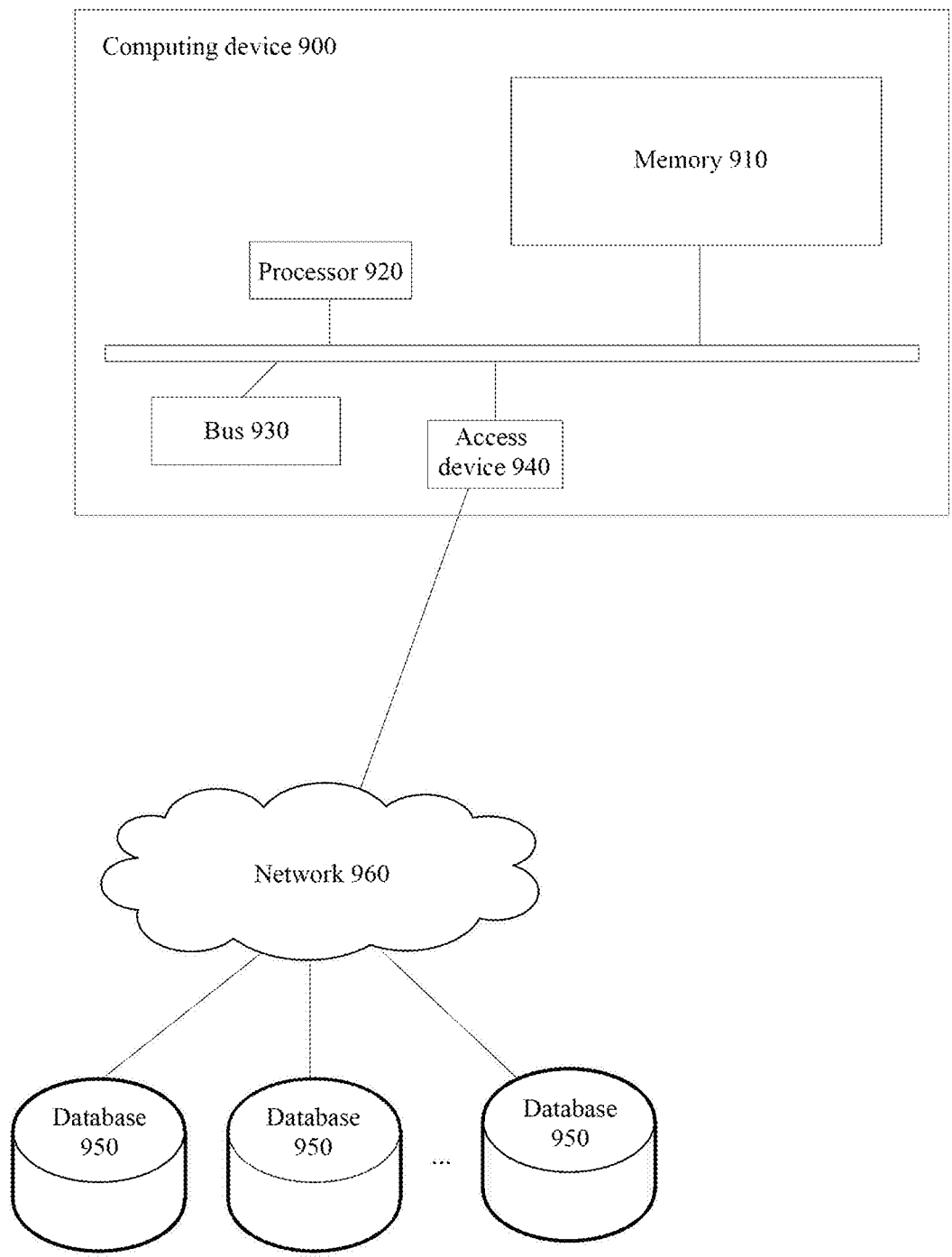
FIG. 9 is a structural block diagram of a computing device provided by an embodiment of the present disclosure.

FIG. 9 shows a structural block diagram of a computing device 900 provided according to an embodiment of the present disclosure. Components of the computing device 900 include but are not limited to a memory 910 and a processor 920. The processor 920 is connected to the memory 910 via bus 930, and a database 950 is configured to store data.

The computing device 900 also includes an access device 940 that enables the computing device 900 to communicate over one or more networks 960. Examples of these networks include a combination of communication networks of Public Switched Telephone Networks (PSTN), Local Area Networks (LAN), Wide Area Networks (WAN), Personal Area Networks (PAN), or such as the Internet. The access device 940 may include one or more of any type of network interface (e.g., Network Interface Card (NIC)) of wired or wireless, such as IEEE802.11 Wireless Local Area Network (WLAN) wireless interface, Worldwide Interoperability for Microwave Access (Wi-MAX) interface, Ethernet interface, Universal Serial Bus (USB) interface, cellular network interface, Bluetooth interface, Near Field Communication (NFC) interface, and so on.

In an embodiment of the present disclosure, the above components of the computing device 900 and other components not shown in FIG. 9 may also be connected to each other, for example by a bus. It should be understood that the structural block diagram of the computing device shown in FIG. 9 is for example purposes only and is not a limitation of the scope of the present disclosure. Persons skilled in the art may add or replace other parts as needed.

The computing device 900 can be any type of stationary or mobile computing device, including mobile computers or mobile computing devices (e.g., tablets, personal digital assistants, laptop computers, notebook computer, netbooks, etc.), mobile phones (e.g., smartphones), wearable computing devices (e.g., smart watches, smart glasses, etc.) or other types of mobile devices, or stationary computing devices such as desktop computers or PCs. The computing device 900 can also be a mobile or stationary server.

The processor 920 is configured to execute the following computer-executable instruction, when the computer-executable instruction is executed by the processor, the steps of the above-mentioned live-streaming processing method are implemented.

The above is an illustrative scheme of a computing device of the present embodiment. It should be noted that a technical scheme of the computing device belongs to the same idea as a technical scheme of the above-mentioned live-streaming processing method. For details not described in detail in the technical scheme of the computing device, please refer to the description of the technical scheme of the above-mentioned live-streaming processing method.

An embodiment of the present disclosure further provides a computer-readable storage medium that stores computer-executable instructions, when the computer-executable instruction is executed by a processor, the steps of the above-mentioned live-streaming processing method are implemented.

The above is an illustrative scheme of a computer readable storage medium of the present embodiment. It should be noted that a technical scheme of the storage medium belongs to the same idea as a technical scheme of the above-mentioned live-streaming processing method. For details not described in detail in the technical scheme of the storage medium, reference may be made to the description of the technical scheme of the above-mentioned live-streaming processing method.

An embodiment of the present disclosure further provides a computer program, where a computer is caused to perform the steps of the above-mentioned live-streaming processing method when the computer program is executed on the computer.

The above is an illustrative scheme of a computer program of the present embodiment. It should be noted that a technical scheme of the computer program belongs to the same idea as a technical scheme of the above-mentioned live-streaming processing method. For details not described in detail in the technical scheme of the computer program, please refer to the description of the technical scheme of the above-mentioned live-streaming processing method.

Specific embodiments of the present disclosure are described above. Other embodiments are within the scope of the attached claims. In some cases, actions or steps described in the claim may be performed in a different sequence than in the embodiment and still achieve the desired result. In addition, the process described in the accompanying diagram does not necessarily require a specific sequence or sequential sequence to achieve the desired result. In some embodiments, multitasking and parallel processing are also possible or may be advantageous.

The computer instruction includes a computer program code, the computer program code can be source code form, object code form, executable file or some intermediate form. The computer readable medium may include: any entity or apparatus, recording medium, USB flash disk, portable hard drive, magnetic disk, optical disc, computer memory, Read-Only Memory (ROM), Random Access Memory (RAM), electric carrier signal, telecommunication signal and software distribution medium, etc., which capable of carrying the computer program code. It should be noted that the contents of the computer readable medium may be appropriately increased or decreased according to the requirements of the legislation and patent practice in the jurisdiction, for example, in some jurisdictions, according to the legislation and patent practice, the computer readable medium does not include electric carrier signals and telecommunications signals.

It should be noted that, for the purpose of simple description, each of the above-mentioned method embodiments is expressed as a series of combinations of actions, but those skilled in the art should be aware that the embodiments of the present disclosure are not limited by the sequence of actions described, because according to the embodiments of the present disclosure, some steps may be performed in a different sequence or simultaneously. Secondly, persons skilled in the art should also be aware that the embodiments described in the present disclosure are preferred embodiments, and that the actions and modules involved are not necessarily necessary for the embodiments of the present disclosure.

In the above embodiments, the description of each embodiment has its own emphasis, and the part not detailed in one embodiment can be referred to the relevant description of other embodiments.

The above disclosed preferred embodiments of the present disclosure are intended only to assist in the elaboration of the present disclosure. The above-mentioned embodiments do not elaborate on all the details and do not limit the present disclosure to the specific embodiments described. Obviously, according to the contents of the embodiments of the present disclosure, many modifications and changes can be made. These embodiments are selected and specifically described in the present disclosure for the purpose of better explaining the principle and practical application of the embodiments of the present disclosure, so that technicians in the technical field can better understand and use the present disclosure. The present disclosure is limited only by the claims and their full scope and equivalents.

The invention claimed is:

1. A live-streaming processing method, applied to a virtual live-streaming control system and comprising:
   using a virtual character to live-stream in a live-streaming room and acquiring a live-streaming setting parameter of the live-streaming room, wherein the live-streaming setting parameter comprises an intelligent broadcast time interval, and the intelligent broadcast time interval corresponds to an intelligent play mode;
   determining a scene type to be played corresponding to the intelligent play mode according to a current play scene type, scene state information and/or play resource attribute information of the live-streaming room in a case that it is determined that a current live-streaming time of the live-streaming room reaches a starting time point of the intelligent broadcast time interval;
   acquiring a material to be played corresponding to the scene type to be played from a preset resource pool based on the scene type to be played, and determining data to be played of the intelligent play mode based on the material to be played; and
   controlling the virtual character to live-stream for the data to be played in the live-streaming room.

2. The live-streaming processing method according to claim 1, wherein the live-streaming setting parameter further comprises a timed broadcast time interval, the timed broadcast time interval corresponds to a timed play mode,
   accordingly, the method further comprises:
   triggering a preset task to be played in the timed play mode corresponding to a starting time point in a case that it is determined that the current live-streaming time of the live-streaming room reaches the starting time point of the timed broadcast time interval; and
   controlling the virtual character to live-stream for data to be played corresponding to the task to be played in the live-streaming room.

3. The live-streaming processing method according to claim 2, before the case that it is determined that the current live-streaming time of the live-streaming room reaches the starting time point of the timed broadcast time interval, comprising:
   acquiring timed broadcast text of the live-streaming room, and creating the task to be played in the timed play mode based on the timed broadcast text and the timed broadcast time interval; and
   placing the task to be played successively in a timed play queue according to a sequence of the timed broadcast time interval.

4. The live-streaming processing method according to claim 3, wherein the triggering the preset task to be played in the timed play mode corresponding to the starting time point comprises:
   based on the starting time point of the timed broadcast time interval, determining the task to be played in the timed play mode from the timed play queue, and triggering the task to be played.

5. The live-streaming processing method according to claim 3, before the controlling the virtual character to live-stream for the data to be played corresponding to the task to be played in the live-streaming room, further comprising:
   receiving a text modification request sent by a user for the task to be played, and determining text to be modified in a timed play text based on modification information carried in the text modification request; and
   sending prompt information indicating that it is unable to modify the text to the user in a case that it is determined that the task to be played in the timed play mode has been triggered.

6. The live-streaming processing method according to claim 5, after the determining the text to be modified in the timed play text based on the modification information carried in the text modification request, further comprising:
   in a case that it is determined that the task to be played in the timed play mode has not been triggered, modifying the text to be modified based on the modification information to acquire modified text to be played;
   modifying the starting time point of the timed broadcast time interval corresponding to the task to be played based on the modification information to acquire a modified starting time point to be played; and
   creating a new task to be played based on the modified text to be played and the modified starting time point to be played, and deleting an untriggered task to be played.

7. The live-streaming processing method according to claim 1, wherein the scene state information comprises a scene fatigue degree, a scene play interval, and the play resource attribute information comprises a play resource related label, a play resource timeliness, and a play resource weight.

8. The live-streaming processing method according to claim 1, wherein the acquiring the material to be played corresponding to the scene type to be played from the preset resource pool based on the scene type to be played comprises:
   acquiring keyword information of current broadcast content in the live-streaming room, wherein the current broadcast content is associated with the current play scene type;

determining keyword information to be played in the scene type to be played based on the keyword information; and determining a material to be played corresponding to the keyword information to be played from the preset resource pool based on the keyword information to be played.

9. The live-streaming processing method according to claim 8, wherein the determining the data to be played of the intelligent play mode based on the material to be played comprises:

determining intelligent play text and intelligent scene data based on the material to be played; and generating the data to be played of the intelligent play mode based on the intelligent play text and the intelligent scene data.

10. The live-streaming processing method according to claim 9, before the acquiring the material to be played corresponding to the scene type to be played from the preset resource pool based on the scene type to be played, further comprising:

acquiring source data from one or more data sources;

preprocessing the source data based on a preset data processing rule to determine resource text corresponding to the source data, and constructing scene for the scene text based on a scene protocol construction rule to acquire scene data corresponding to the resource text; and constructing the preset resource pool based on the resource text and the scene data.

11. The live-streaming processing method according to claim 1, further comprising:

acquiring an interstitial event occurring in the live-streaming room, and determining interstitial text corresponding to the interstitial event based on the interstitial event;

constructing a scene for the interstitial text based on a scene protocol construction rule, and determining data to be played corresponding to the interstitial text; and driving the virtual character to interstitially played the data to be played in the live-streaming room.

12. A computing device, comprising:

a memory and a processor;

wherein the memory is configured to store computer executable instructions, and the processor is configured to execute the computer executable instructions, the processor, when executing the computer executable instructions is configured to:

use a virtual character to live-stream in a live-streaming room and acquire a live-streaming setting parameter of the live-streaming room, wherein the live-streaming setting parameter comprises an intelligent broadcast time interval, and the intelligent broadcast time interval corresponds to an intelligent play mode;

determine a scene type to be played corresponding to the intelligent play mode according to a current play scene type, scene state information and/or play resource attribute information of the live-streaming room in a case that it is determined that a current live-streaming time of the live-streaming room reaches a starting time point of the intelligent broadcast time interval;

acquire a material to be played corresponding to the scene type to be played from a preset resource pool based on the scene type to be played, and determine data to be played of the intelligent play mode based on the material to be played; and control the virtual character to live-stream for the data to be played in the live-streaming room.

13. The computing device according to claim 12, wherein the live-streaming setting parameter further comprises a timed broadcast time interval, the timed broadcast time interval corresponds to a timed play mode, accordingly, the processor is configured to:

trigger a preset task to be played in the timed play mode corresponding to a starting time point in a case that it is determined that the current live-streaming time of the live-streaming room reaches the starting time point of the timed broadcast time interval; and control the virtual character to live-stream for data to be played corresponding to the task to be played in the live-streaming room.

14. The computing device according to claim 13, wherein the processor is configured to:

acquire timed broadcast text of the live-streaming room, and create the task to be played in the timed play mode based on the timed broadcast text and the timed broadcast time interval; and place the task to be played successively in a timed play queue according to a sequence of the timed broadcast time interval.

15. The computing device according to claim 12, wherein the scene state information comprises a scene fatigue degree, a scene play interval, and the play resource attribute information comprises a play resource related label, a play resource timeliness, and a play resource weight.

16. The computing device according to claim 12, wherein the processor is configured to:

acquire keyword information of current broadcast content in the live-streaming room, wherein the current broadcast content is associated with the current play scene type;

determine keyword information to be played in the scene type to be played based on the keyword information; and determine a material to be played corresponding to the keyword information to be played from the preset resource pool based on the keyword information to be played.

17. The computing device according to claim 16, wherein the processor is configured to:

determine intelligent play text and intelligent scene data based on the material to be played; and generate the data to be played of the intelligent play mode based on the intelligent play text and the intelligent scene data.

18. The computing device according to claim 17, wherein the processor is configured to:

acquire source data from one or more data sources;

preprocess the source data based on a preset data processing rule to determine resource text corresponding to the source data, and construct scene for the scene text based on a scene protocol construction rule to acquire scene data corresponding to the resource text; and construct the preset resource pool based on the resource text and the scene data.

19. The computing device according to claim 12, wherein the processor is configured to:

acquire an interstitial event occurring in the live-streaming room, and determine interstitial text corresponding to the interstitial event based on the interstitial event;

construct a scene for the interstitial text based on a scene protocol construction rule, and determine data to be played corresponding to the interstitial text; and drive the virtual character to interstitially played the data to be played in the live-streaming room.

20. A non-transitory computer-readable storage medium, wherein the computer-readable memory medium stores computer executable instructions, a processor, when executing the computer executable instructions is configured to:
- use a virtual character to live-stream in a live-streaming room and acquire a live-streaming setting parameter of the live-streaming room, wherein the live-streaming setting parameter comprises an intelligent broadcast time interval, and the intelligent broadcast time interval corresponds to an intelligent play mode;
- determine a scene type to be played corresponding to the intelligent play mode according to a current play scene type, scene state information and/or play resource attribute information of the live-streaming room in a case that it is determined that a current live-streaming time of the live-streaming room reaches a starting time point of the intelligent broadcast time interval;
- acquire a material to be played corresponding to the scene type to be played from a preset resource pool based on the scene type to be played, and determine data to be played of the intelligent play mode based on the material to be played; and
- control the virtual character to live-stream for the data to be played in the live-streaming room.

* * * * *